UNITED STATES PATENT OFFICE.

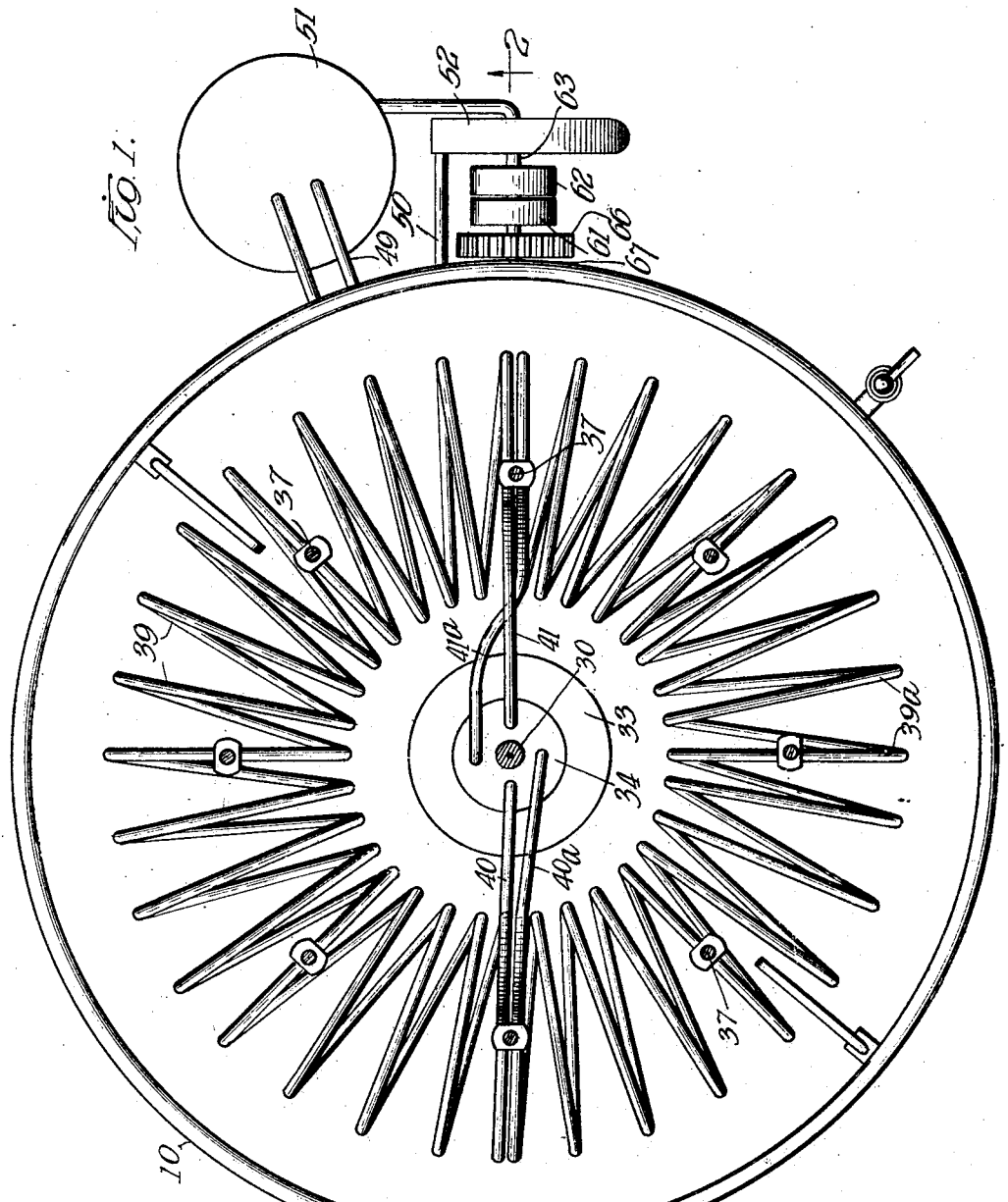

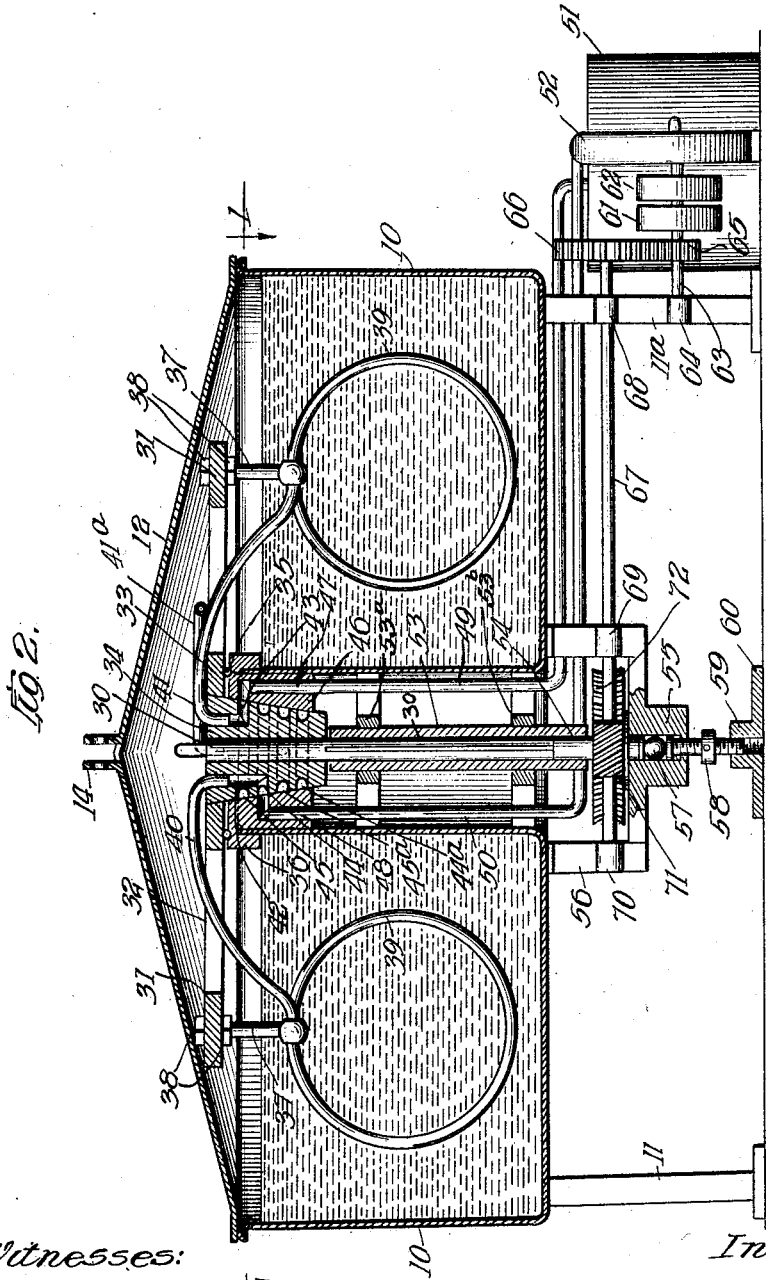

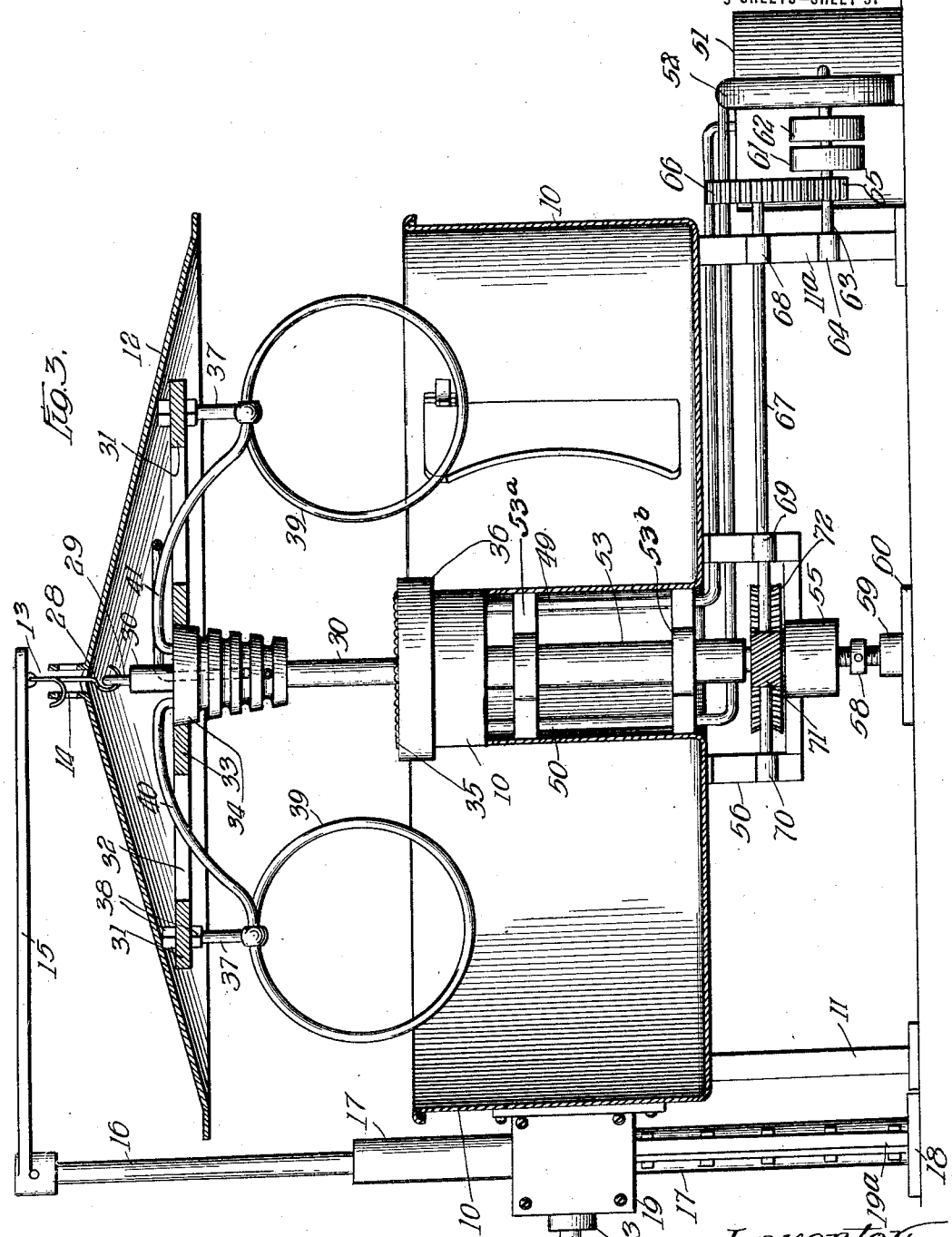

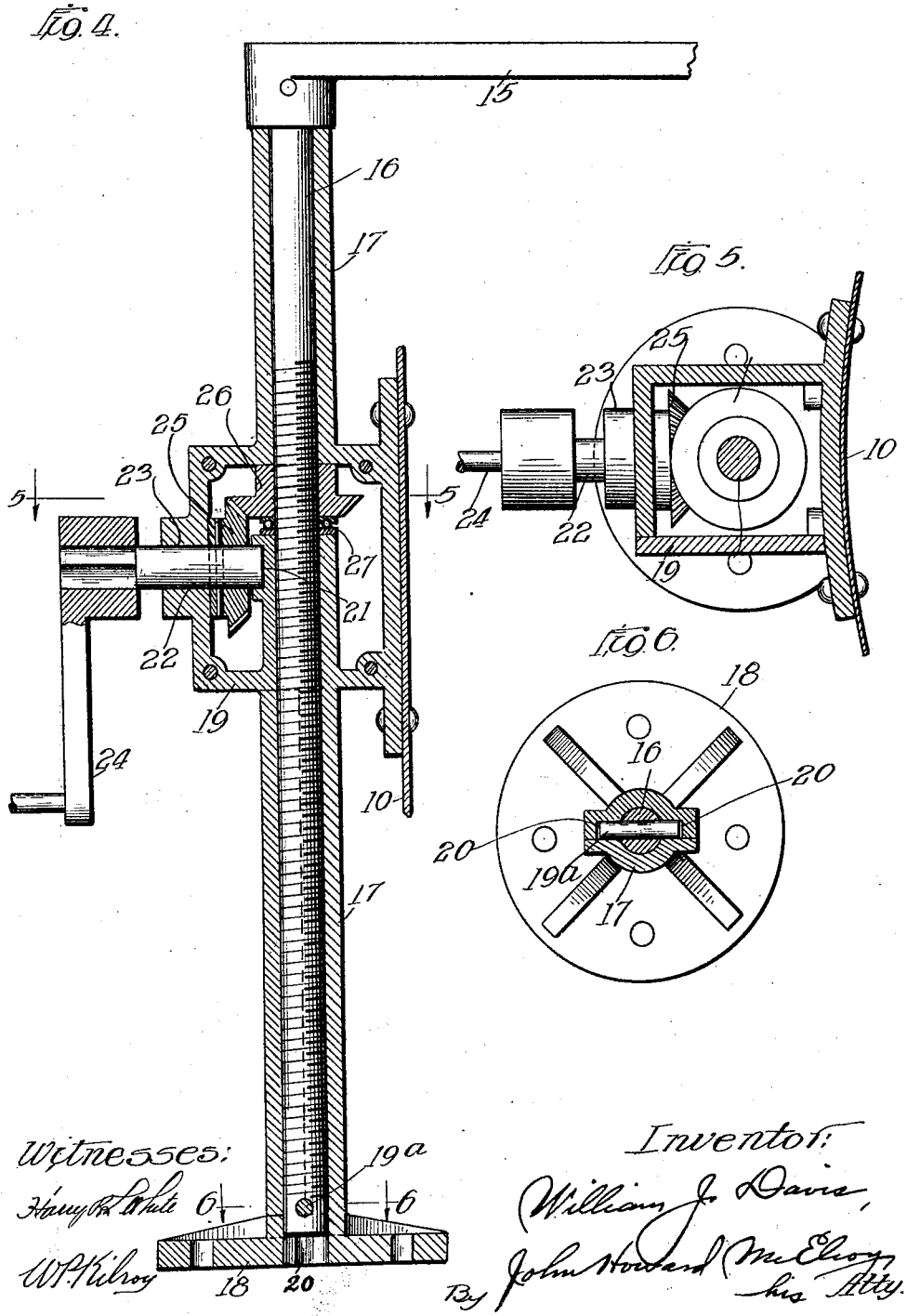

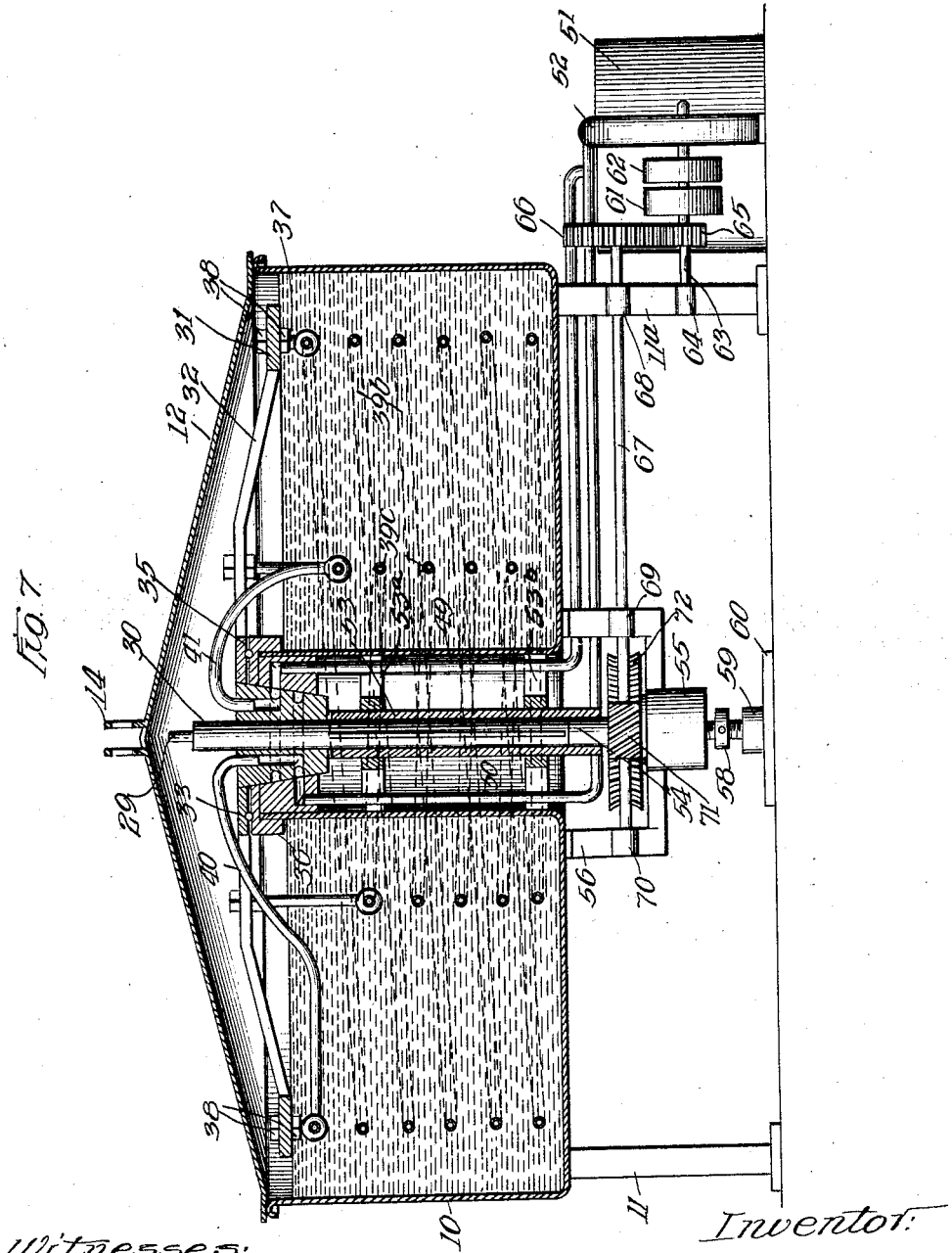

WILLIAM J. DAVIS, OF CHICAGO, ILLINOIS.

MILK-HANDLING MACHINERY.

1,407,014.  Specification of Letters Patent.  Patented Feb. 21, 1922.

Application filed August 16, 1920. Serial No. 403,653.

*To all whom it may concern:*

Be it known that I, WILLIAM J. DAVIS, a citizen of the United States, and a resident of Chicago, in the county of Cook and State of Illinois, have invented certain new and useful Improvements in Milk-Handling Machinery, of which the following is a full, clear, and exact specification.

My invention is concerned with milk handling machinery and is designed to produce a simple and novel structure intended primarily for making butter-milk or treating milk with cultures, but which may be used for pasteurizing, holding, cooling or standardizing.

To this end it consists primarily of an annular vat in which is removably supported on a rotatable frame a series of coils normally located in the vat through which a heating or cooling liquid can be pumped to raise or lower the temperature of the milk in the vat. A novel mechanism connected to the coils is located in the open center of the tank, so that when the coils are rotated about the valve as a center to break up the curds of the butter-milk, the circulation of the liquid through the coils can be continued to reduce its temperature during the breaking up process.

I preferably provide means for lifting the coils out of the vat and raising its cover so that the apparatus can be more readily cleaned than is possible with the coils in place in the vat.

It is also concerned with certain other combinations and features of construction, all as will be fully described in the specification and particularly pointed out in the claims.

To illustrate my invention, I annex hereto five sheets of drawings in which the same reference characters are used to designate identical parts in all the figures of which—

Fig. 1 is a top plan view of the apparatus as seen in section on the line 1—1 of Fig. 2;

Fig. 2 is a sectional vertical section as seen on the line 2—2 of Fig. 1;

Fig. 3 is a view generally similar to Fig. 2 but showing the cover and coils lifted for cleaning the apparatus;

Fig. 4 is a central vertical section through the jack mechanism for lifting the cover and coils;

Figs. 5 and 6 are details in section on the lines 5—5 and 6—6, respectively, of Fig. 4; and Fig. 7 is a view similar to Fig. 2 but illustrating a modified construction and arrangement of the coils.

In carrying out my invention in its preferred form, I employ an annular vat 10, which is preferably enameled on its interior, and is supported at its periphery by preferably four or more legs 11, one of them 11ª, being modified to form a bearing for some of the shafts. The vat is provided with a suitable cover or lid 12, which is preferably suspended as by the hook 13 co-operating with one of the pair of eyes 14 provided at the center and apex of the cover which is of the general shape of a flattened cone. The hook 13 is suspended from the outer end of the arm 15, which is secured on the upper end of the threaded rod 16 which is mounted to slide up and down but not to turn in the sleeve 17, which has the base 18, and which is further supported by reason of the gear casing 19, forming a part of the sleeve being riveted to the side of the vat 10, as clearly shown in Fig. 4. To prevent the turning of the rod 16, in the sleeve 17, I provide some suitable spline mechanism, such as that shown in Fig. 6, where a pin 19ª is shown as extending through an aperture in the rod and projecting into the pair of diametrically opposed grooves 20 formed in the sides of the lower portion of the sleeve. The bearing 21 is formed on the sleeve in the casing 19 for the inner end of the short horizontal shaft 22 which is also journaled in bearing 23 provided in the casing 19, and has secured on the outer end thereof the handle 24 by which it is turned. Secured near the inner end of the shaft 22 is the miter gear 25 meshing with the miter gear 26, which has its hub internally threaded and meshing with the screw threads on the rod 16. Ball bearings 27 are preferably interposed between the miter gear 26 and the upper end of the adjacent section of the sleeve 17. In the construction shown it will be obvious that as the handle 24 is turned in one direction the rod 16 will be raised to lift the cover, and when turned in the other direction will be lowered to replace the cover.

Also suspended from the arm 15 by the hook 28 engaging the eye 29 formed on the upper end of the shaft 30 is the annular frame 31, preferably provided with one or more radial arms 32 connecting it to the central disk or hub 33 which is secured to the tapered male member 34, as seen in Figs.

2 and 3. This hub and the connected member 34 is mounted to turn on the ball bearings 35 interposed between the hub 33 and the annulus 36 which is supported on the upper end of the tubular passage formed by the central portion of the vat 10. Suspended from the frame 31 by the eye bolts 37 secured in any desired adjustment by the nuts 38 are the coils of pipe 39, which coils are arranged in the general form of an annulus, which annulus is preferably made up of two halves, as conditions may arise under which I wish to apply a heating or cooling liquid to the contents of the vat through half of the coils instead of all of them. The outlet ends 40 and 41 of one of the two coiled sections open into and are secured in ports 42 and 43, entering the top of the member 34 and opening in the tapered sides thereof in the annular channels 44 and 45. The female member 46 in the form of an annulus secured in the top of the cylindrical open space in the center of the vat has the tapered seat for the member 34, and the L-shaped passages 47 and 48 opening into the plane of the channels 45 and 44 respectively, and the pipes 49 and 50 extend from said passages 47 and 48 to the tank 51 and the pump 52, respectively, so that as the pump 52 drives its hot or cold water from any source of supply, such as the tank 51 which may have steam or ammonia coils therein, it is pumped through the length of the coil 39 and is discharged through the pipe 49 into the tank 51, where it is reheated or recooled before continuing in its circuit again. Where the coil 39 is divided into two sections, as shown in Fig. 1, the section 39$^a$ terminates in the pipes 40$^a$ and 41$^a$ opening into the L-shaped passages (not shown) similar to the passages 42 and 43, but set between them and opening into the lower annular channels 44$^a$ and 45$^a$, which are connected by channels and pipes similar to the channels 47 and 48 and the pipes 49 and 50 to the pump 52 and the tank 51, since the circulation of the heating or cooling fluids in the two sets of coils is the same as where they form a single set, with the advantage that a greater supply of the heating or cooling fluid, as the case may be, can be supplied through the two sets of coils than is possible with one set.

The shaft 30 is splined in a sleeve 53 secured on the top of the vertical shaft 54 journaled in the bearing 55 forming the bottom of the bracket 56 secured to the under side of the center of the vat, preferably being adjustably supported on the ball 57, which in turn is supported on the screw 58, having its reversely threaded ends co-operating with threads in the bottom of the bearing 55 and in the boss 59 of the supporting base 60, the adjustment forming a means for leveling up the center with the edges of the vat. The sleeve 53 is journaled in a pair of bearings 53$^a$ and 53$^b$ supported from the upper and lower portions, respectively, of the inner portion of the vat 10, as seen in Figs. 2, 3 and 7.

To move the coils 39 about the shaft 30 as a center, I employ power from any suitable source which may be applied by the fast and loose pulleys 61 and 62 to the shaft 63 journaled in the bearing 64 and having the other end journaled in the casing of the pump 52 which it may also operate. A spur gear pinion 65 secured on the shaft 63 meshes with the spur gear wheel 66 secured on the shaft 67 journaled in the bearings 68, 69 and 70 secured on the leg 11$^a$ and the bracket 56. A worm 71 on the shaft 67 meshes with a worm gear wheel 72 secured on the shaft 54, so that the desired rotation of the coils 39 about the shaft 30 as a center is secured by the gearing described. It will be also noted that the driving connections thus described do not interfere with the lifting of the coils 39 and the cover 12 for cleaning the coils, as previously described.

In Fig. 7, I illustrate similar construction, but instead of having the coils 39 arranged, as shown in Figs. 1 and 2, I employ the coils 39$^b$ and 39$^c$, which are arranged concentrically about the shaft 30 as a center instead of about the circular center for the coils illustrated in Figs. 1 and 2. The connections of the coils 39$^b$ and 39$^c$ with the pump and tank will be the same as heretofore described, and the coils are preferably connected up, as shown in Fig. 7, so that the heating or cooling fluid, as the case may be, passes first through one coil, then through the other and is finally returned to the tank 51.

In both of the foregoing constructions it will be noted that I have entirely dispensed with all mechanism or bearings located either in or directly above the milk, so that there is no danger of the milk being fouled by grease from bearings or that the operation of the mechanism can be interfered with by the clogging of it from accummulated cream, etc.

While I have shown and described my invention as embodied in the form which I at present consider best adapted to carry out its purposes, it will be understood that it is capable of wide modifications, and that I do not desire to be limited in the interpretation of the following claims, except as may be necessitated by the state of the prior art.

What I claim as new and desire to secure by Letters Patent of the United States is:

1. In an apparatus of the class described, the combination with a vat having a central vertical passage therethrough, of a pipe looped therein to form a tortuous channel within the vat, a frame mounted to rotate above the vat and supporting the pipe, a vertical standard at the side of the vat having an arm at its top extending over the center of the vat, a handle, and reducing gearing from the handle to the standard so that the latter can be raised by turning the handle.

2. In an apparatus of the class described, the combination with a vat having a central vertical passage therethrough, of a pipe looped therein to form a tortuous channel within the vat, a frame mounted to rotate above the vat and supporting the pipe, a vertical standard at the side of the vat having an arm at its top extending over the center of the vat, a handle, and reducing gearing from the handle to the standard so that the latter can be raised by turning the handle, said gearing consisting of a miter gear secured on the shaft supporting the handle, a co-operating miter gear secured on a rotating nut, threads on the standard shaft, and means for preventing the rotation of said standard shaft.

3. In an apparatus of the class described, the combination with a vat having a central vertical passage therethrough, of a pipe looped therein to form a tortuous channel within the vat, a frame mounted to rotate above the vat and supporting the pipe, a male connection member carried by the rotating frame, a female connection member in the passage in which the male member is seated, connections from the pipe to the male member, pipes leading from the female member to a liquid supply, a shaft extending downward centrally from the male member, a sleeve in which the shaft is splined, a stationary bearing for the sleeve, and means for rotating the latter.

4. In an apparatus of the class described, the combination with a vat having a central vertical passage therethrough, of a pipe looped therein to form a tortuous channel within the vat, a frame mounted to rotate above the vat and supporting the pipe, a male connection member carried by the rotating frame, a female connection member in the passage in which the male member is seated, connections from the pipe to the male member, pipes leading from the female member to a liquid supply, a shaft extending downward centrally from the male member, a sleeve in which it is splined, a stationary bearing for the sleeve, and means for rotating the latter, said means consisting of a worm gear connected to the sleeve, a worm, a shaft connected to the worm, and means for rotating the worm shaft.

5. In an apparatus of the class described, the combination with a vat having a vertical passage therethrough, of a pipe looped therein to form a tortuous channel within the vat, a male connection member rotating with the pipe and having passages therein connected to the pipe terminating in annular channels in its seat surface, and a female connection member in which said male member is seated having passages opening to each of said annular channels.

6. In an apparatus of the class described, the combination with a vat having a central vertical passage therethrough, of an agitator in said vat, a frame mounted to rotate above the vat concentrically with the central vertical passage therethrough and supporting the agitator, and means for lifting said frame to raise the agitator out of the vat.

7. In an apparatus of the class described, the combination with a vat having a central vertical passage therethrough, of an agitator in the vat, a frame mounted to rotate above the vat concentrically therewith and supporting the agitator, a vertical standard at the side of the vat having an arm at its top extending over the center of the vat, a handle, and reducing gearing from the handle to the standard so that the latter can be raised by turning the handle.

In witness whereof, I have hereunto set my hand and affixed my seal, this 11th day of August, A. D. 1920.

WILLIAM J. DAVIS. [L. S.]

Witness:
JOHN HOWARD MCELROY.